United States Patent
Chen et al.

(10) Patent No.: US 10,004,102 B2
(45) Date of Patent: Jun. 19, 2018

(54) AUTOMATIC CONFIGURATION OF A WIRELESS DISTRIBUTION SYSTEM EXTENDED NETWORK

(71) Applicant: ARRIS Enterprises, Inc., Suwanee, GA (US)

(72) Inventors: Xi Chen, San Diego, CA (US); Meng Zhang, San Diego, CA (US); Gregory Nakanishi, San Diego, CA (US); Tao Song, San Diego, CA (US); Alan R. Zeleznikar, Oceanside, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 213 days.

(21) Appl. No.: 15/006,692

(22) Filed: Jan. 26, 2016

(65) Prior Publication Data

US 2016/0219631 A1    Jul. 28, 2016

Related U.S. Application Data

(60) Provisional application No. 62/107,589, filed on Jan. 26, 2015.

(51) Int. Cl.
*H04W 4/00*        (2018.01)
*H04W 76/02*       (2009.01)
(Continued)

(52) U.S. Cl.
CPC .......... *H04W 76/10* (2018.02); *H04W 24/02* (2013.01); *H04W 72/085* (2013.01);
(Continued)

(58) Field of Classification Search
None
See application file for complete search history.

(56) References Cited

U.S. PATENT DOCUMENTS

2006/0251021 A1* 11/2006 Nakano ............ H04W 36/0038
                                                    370/331
2007/0008889 A1    1/2007 Seo
(Continued)

FOREIGN PATENT DOCUMENTS

EP          2378829 A1    10/2011
WO       2005/011182 A2     2/2005

OTHER PUBLICATIONS

PCT Search Report & Written Opinion, RE: Application No. PCT/US2016/014976, dated Apr. 20, 2016.

*Primary Examiner* — Phirin Sam
(74) *Attorney, Agent, or Firm* — Bart A. Perkins

(57) ABSTRACT

Methods, systems, and computer readable media may be operable to facilitate the automatic configuration of a network device within a wireless distribution system (WDS) extended network. Upon the boot of a network device such as a network extender, the network device may search for an access point through the transmission and reception of wireless communications. Once an access point is found, the network device may attempt to connect to the access point and may self-configure as either a station or a station operating as an access point. The network device may make the determination whether to operate as an access point based upon one or more network and/or device parameters associated with the identified access point, and may switch between station and station-access point modes based upon the link connecting the network device to the access point.

20 Claims, 6 Drawing Sheets

(51) Int. Cl.
*H04W 72/08* (2009.01)
*H04W 24/02* (2009.01)
*H04W 84/04* (2009.01)
*H04W 84/12* (2009.01)

(52) U.S. Cl.
CPC .......... *H04W 76/02* (2013.01); *H04W 84/047* (2013.01); *H04W 84/12* (2013.01)

(56) References Cited

U.S. PATENT DOCUMENTS

| | | | | |
|---|---|---|---|---|
| 2007/0115899 A1* | 5/2007 | Ovadia | ................ | H04W 36/24 370/338 |
| 2007/0207804 A1* | 9/2007 | Sharma | ............ | H04L 29/06027 455/436 |
| 2012/0317247 A1* | 12/2012 | Dattagupta | ........... | H04W 84/00 709/220 |
| 2013/0033995 A1* | 2/2013 | Kraglund | .............. | H04W 48/16 370/252 |
| 2014/0146787 A1* | 5/2014 | Cherian | ................ | H04W 12/06 370/331 |
| 2014/0204826 A1* | 7/2014 | Cherian | ................ | H04W 48/14 370/312 |
| 2014/0328190 A1* | 11/2014 | Lord | .................... | H04W 24/08 370/252 |
| 2015/0055566 A1* | 2/2015 | Lin | ....................... | H04W 76/02 370/329 |
| 2015/0208310 A1* | 7/2015 | Taneja | ............. | H04W 36/0066 370/331 |
| 2015/0215832 A1* | 7/2015 | Fitzpatrick | ........... | H04W 36/04 455/426.1 |
| 2015/0222507 A1* | 8/2015 | Choy | ................. | H04L 43/0811 370/252 |
| 2015/0237513 A1* | 8/2015 | Garrett | ............... | H04L 25/0224 370/252 |
| 2017/0149609 A1* | 5/2017 | Tofighbakhsh | ..... | H04L 41/0816 |

* cited by examiner ate new extenders in com-
munication with an access point may be referred to as a
wireless distribution system (WDS) extended network and
may provide a greater range than that of a standard wireless
network.

AUTOMATIC CONFIGURATION OF A WIRELESS DISTRIBUTION SYSTEM EXTENDED NETWORK

CROSS REFERENCE TO RELATED APPLICATION

This application is a non-provisional application claiming the benefit of U.S. Provisional Application Ser. No. 62/107,589, entitled "Automatic Configuration of a Wireless Distribution System Extended Network," which was filed on Jan. 26, 2015, and is incorporated herein by reference in its entirety.

TECHNICAL FIELD

This disclosure relates to the configuration of wireless network devices.

BACKGROUND

Typically, an access point such as a gateway device may provide a plurality of services to a customer premise, and the plurality of services may be provided through wireless communications passed between the access point and one or more client devices or stations. The delivery of wireless communications between an access point and a client device may be limited by the strength of a signal existing between the access point and a client device. For example, distance, obstacles, signal type, and radio transmit power may affect the delivery of wireless communications between an access point and client device.

One or more network extenders (e.g., Wireless Ethernet Coax Bridge (WECB)) may be installed within a customer premise to expand the range of a wireless network that is provided by an access point. Such a wireless home network that incorporates one or more network extenders in communication with an access point may be referred to as a wireless distribution system (WDS) extended network and may provide a greater range than that of a standard wireless network.

However, manual configuration of a WDS network is a tedious and error-prone task that typically requires specialized technical knowledge. For example, installation of the one or more network extenders typically requires that a user, installer, or technician manually configure each network extender with wireless network parameters (e.g., service set identifier (SSID) information) that are applied at the access point. Moreover, various security measures (e.g., passwords/passphrases, encryption keys, etc.) may need to be overcome in order to enable a network extender to communicate with an access point. Further, each time that an update to network parameter(s) is made at the access point, the update(s) must typically be repeated at some or all of the network extenders associated with the access point. Also, configuration parameters may need to be modified when a network extender is relocated within a subscriber premise in order to associate the network extender with an appropriate access point. Therefore, it is desirable to improve upon methods, systems and apparatuses for configuring a WDS network.

BRIEF DESCRIPTION OF THE DRAWINGS

Like reference numbers and designations in the various drawings indicate like elements.

DETAILED DESCRIPTION

Figure 1:
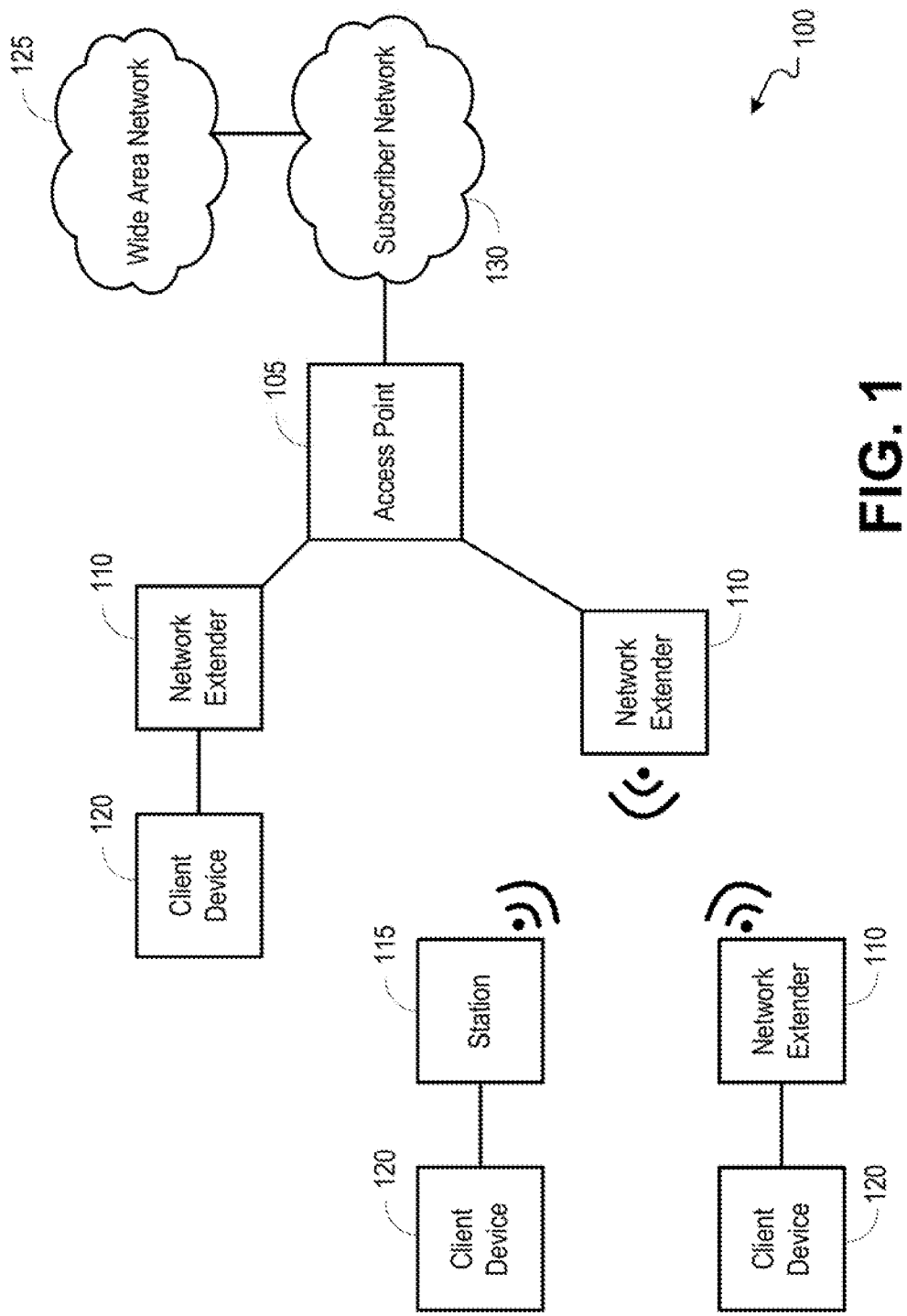
FIG. 1 is a block diagram illustrating an example network environment operable to facilitate the automatic configuration of a network device within a wireless distribution system extended network.

It is desirable to improve upon methods and systems for configuring a wireless distribution system (WDS) network. Methods, systems, and computer readable media may be operable to facilitate the automatic configuration of a network device within a WDS extended network. Upon the boot of a network device such as a network extender, the network device may search for an access point through the transmission and reception of wireless communications. Once an access point is found, the network device may attempt to connect to the access point and may self-configure as either a station or a station operating as an access point. The network device may make the determination whether to operate as an access point based upon one or more network and/or device parameters associated with the identified access point, and may switch between station and station-access point modes based upon the link connecting the network device to the access point.

An embodiment of the invention described herein may include a method comprising: (a) outputting a request for a network address from a network device; (b) if no network address is received, configuring the network device as a station; (c) associating the network device with an access point; (d) determining whether a received signal strength indicator associated with the access point is greater than a predetermined add threshold; and (e) if the received signal strength indicator associated with the access point is greater than the predetermined add threshold: (i) configuring the network device as a remote base station; and (ii) establishing a wireless distribution system link between the network device and the access point.

According to an embodiment of the invention, the access point is configured as a remote base station or a master base station.

According to an embodiment of the invention, the method described herein further comprises: (a) detecting a degradation in a link between the network device and the access point; (b) identifying a second access point, wherein the second access point is identified based upon a beacon message received at the network device from the access point, the beacon message identifying the access point as a master base station or a remote base station; (c) determining whether a received signal strength indicator associated with the second access point is greater than the predetermined add threshold; and (d) if the received signal strength indicator associated with the second access point is greater than the predetermined add threshold, associating the network device with the second access point.

According to an embodiment of the invention, detecting the degradation in the link between the network device and the access point comprises determining that the received signal strength indicator associated with the access point is less than a predetermined drop threshold.

According to an embodiment of the invention, the method described herein further comprises: (a) wherein the access point is identified from a plurality of access points; (b) determining a bandwidth capability for each of the plurality of access points; and (c) wherein the identified access point comprises the highest bandwidth capability of the plurality of access points.

According to an embodiment of the invention, determining the bandwidth capability for each of the plurality of access points comprises, for each respective one of the plurality of access points, retrieving a bandwidth capability indicator from a beacon received at the network device from the respective one access point.

According to an embodiment of the invention, the method described herein further comprises updating a beacon message that is output from the network device to include an indication of the configuration of the network device as a remote base station.

An embodiment of the invention described herein may include a network device comprising: (a) an interface configured to be used to output a request for a network address; (b) one or more modules configured to: (i) configure the network device as a station if no network address is received; (ii) associate the network device with an access point; (iii) determine whether a received signal strength indicator associated with the access point is greater than a predetermined add threshold; and (iv) configure the network device as a remote base station and establish a wireless distribution system link between the network device and the access point if the received signal strength indicator associated with the access point is greater than the predetermined add threshold.

An embodiment of the invention described herein may include one or more non-transitory computer readable media having instructions operable to cause one or more processors to perform the operations comprising: (a) outputting a request for a network address from a network device; (b) if no network address is received, configuring the network device as a station; (c) associating the network device with an access point; (d) determining whether a received signal strength indicator associated with the access point is greater than a predetermined add threshold; and (e) if the received signal strength indicator associated with the access point is greater than the predetermined add threshold: (i) configuring the network device as a remote base station; and (ii) establishing a wireless distribution system link between the network device and the access point.

FIG. 1 is a block diagram illustrating an example network environment 100 operable to facilitate the automatic configuration of a network device within a wireless distribution system (WDS) extended network. In embodiments, an access point 105 may route communications to and from one or more network devices. The one or more network devices may include network extenders 110, stations 115, client devices 120 (e.g., set-top boxes (STBs), computers, tablets, televisions, mobile devices, or any other Ethernet or Wi-Fi end-device), and others. The client device(s) 120 may operate as stations when configured to receive and/or transmit wireless communications.

The access point 105 may include a gateway, a cable modem, a wireless router including an embedded cable modem, a mobile hot-spot router, a multimedia over coaxial alliance (MoCA) node, and any other device that is operable to route communications to and from a network device. It should be understood that a subscriber premise may include one or more access points 105 connected to a gateway device (e.g., residential gateway device). The access point(s) 105 may be connected to a gateway device or to an upstream network (e.g., subscriber network 130) via an Ethernet connection.

The access point 105 may provide one or more services such as video service(s), data service(s), and/or voice services to one or more client devices 120, and may retrieve the one or more services from a wide area network 125 via a subscriber network 130 (e.g., coaxial cable, optical fiber, twisted pair network, wireless networks including 4G and LTE, etc.). The access point 105 may forward upstream communications from the one or more client devices 120 to a wide area network 125.

In embodiments, an access point 105 may provide one or more service sets, and the service sets may be identified using unique service set identifiers (SSID). Service sets may be used for delivering traffic between a client device 120 and the access point 105, and each service set may be designated for a particular service (e.g., video, data, security, hotspot, etc.). In embodiments, the client devices 120 may identify a service set and may connect to a service set provided by the access point 105.

In embodiments, a network extender 110 may be associated with an access point 105, and the network extender 110 may facilitate the delivery of multiple services to one or more stations 115 (e.g., wireless devices configured to receive wireless communications from and transmit wireless communications to an access point 105 or network extender 110) and/or client devices 120. The network extender 110 may be configured with network parameters of the associated access point 105, thereby extending the range of a wireless network provided by the access point 105. For example, the network extender 110 may be configured with SSID(s), passwords/passphrases, and various other wireless parameter information associated with the access point 105. It will be appreciated by those skilled in the relevant art that a channel of communication may be established between the access point 105 and a network extender 115 using any of a variety of communication technologies (e.g., MoCA, 802.11, G.hn, HomePlug AV (HPAV), HPAV2, Bluetooth, Zigbee, Zwave, etc.).

An access point 105 may communicate with one or more network extenders 110 over a wireless distribution system (WDS). For example, the access point 105 may be configured as a master base station (MBS) (e.g., the access point 105 assumes a master role within an automatic WDS network) and the network extenders 110 may be configured as remote base stations (RBS) (e.g., the network extenders 110 assume a remote role within an automatic WDS network). It should be understood that various types of devices including access points 105, gateway devices (not shown), network extenders 110, and any other device configured to transmit and/or receive wireless communications may be configured as either a MBS or a RBS.

In embodiments, one or more network extenders 115 may be connected to an access point 105 via a multimedia over coax alliance (MoCA) connection or any other medium used for communication (e.g., MoCA, 802.11, G.hn, HomePlug AV (HPAV), HPAV2, Bluetooth, Zigbee, Zwave, etc.). The access point 105 may create one or more virtual local area networks (VLAN) over a MoCA interface to correspond with service set identifiers (SSID) (e.g., private SSID, Ethernet, etc.) at the one or more network extenders 110. The access point 105 may maintain a record identifying device(s) (e.g., stations 115, client devices 120, etc.) associated with each of the one or more network extenders 110.

Communications may be passed between a network extender 110 and a station 115 or client device 120 over a wireless local area network (WLAN) (e.g., as 802.11 packet exchanges over a Wi-Fi link). An access point device may be configured to operate as both a station and a RBS. For example, an access point device (e.g., access point 105, network extender 110, etc.) may be configured to receive and route communications to a wired end-device (e.g., client device 120) and to route wireless communications between another access point device (e.g., access point 105) and a wireless network device such as a station 115 or network extender 110.

In embodiments, a network extender 110 configured as a RBS may apply configuration parameters associated with the access point 105 and with configuration information associated with one or more stations 115, client devices 120, and/or other network extenders 110 that are designated to wirelessly communicate with the network extender 110. For example, the network extender 110 may cache and store these network parameter attributes in non-volatile memory to preserve the network parameter attributes over a reboot. Configuration information stored at the network extender 110 may include media access control (MAC) addresses associated with devices operating as either access points/MBSs or network extenders/RBSs, an operation mode controlling whether the network extender 110 is operating as an access point/MBS or a network extender/RBS, wireless network parameters (e.g., SSID, passphrase, etc.), and other information.

In embodiments, configuration of one or more network devices (e.g., access point 105, network extenders 110, station 115, client devices 120, etc.) may be automated such that the network devices automatically join a network provided by an access point (e.g., access point 105, gateway device, etc.), collect configuration parameters and information (e.g., MAC addresses, WPA passphrase, SSID, etc.) from associated network devices, determine in which functional mode to operate (e.g., MBS, RBS, etc.), and initiate data traffic flow without intervention from an end-user. The automatic configuration of network devices may include a decision for a wireless station 115 or network extender 110 to select a best access point 105 or network extender 110 during association and roaming. For example, the best access point 105 or network extender 110 may be the available network device having the strongest received signal strength indicator (RSSI) and/or the available network device having the highest bandwidth capability. It should be understood that the determination of a best access point 105 or network extender 110 may be based on other metrics.

In embodiments, an automatic configuration algorithm may allow network device configurations to be automatically updated when devices within a network are rearranged. For example, a network extender 110 or station 115 may disassociate from an access point 105 or network extender 110 when the network extender 110 or station 115 determines that it is outside of a functional range of the access point 105 or network extender 110, and the network extender 110 or station 115 can associate with a different access point 105 or network extender 110 and reconfigure as a station if necessary. A network device such as a network extender 110 or station 115 may determine that it is outside of a functional range of an associated access point 105 or network extender 110 when the network device receives a RSSI from the associated access point 105 or network extender 100 that is below a threshold level or when the bandwidth provided to the network device drops below a threshold level. The determination that a network device is outside of a functional range of an associated access point 105 or network extender 110 may be based upon an identification of another access point 105 or network extender 110 that is capable of providing the network device with a stronger RSSI or more bandwidth.

An access point 105 or network extender 110 that is configured as a MBS in a WDS extended network can operate as an access point in a typical wireless local area network (WLAN) by allowing stations (e.g., other network extenders 110, stations 115, client devices 120, etc.) to associate with it, and/or the access point 105 can operate as a MBS in a WDS extended network by allowing one or more network extenders 110 or RBSs to associate with it. A network extender 110 that is configured as a RBS may associate with a MBS or another RBS (e.g., an access point 105 or network extender 110) as a station and may also operate as an access point by allowing a station (e.g., network extender 110, station 115, client device 120, etc.) to associate with it. Thus, an RBS may be associated with an access point over a WDS link and one or more stations may be associated with the RBS over a WLAN (e.g., Wi-Fi) link.

When a network device (e.g., network extender 110, station 115, client device 120, etc.) boots up, the network device may request an Internet protocol (IP) address (e.g., through the device's Ethernet port) from an access point 105 or gateway/router device via dynamic host configuration protocol (DHCP). If an IP address is received by the network device, the network device may be configured as both an access point and a MBS. When the network device is operating as a MBS, the network device may inform other network devices (e.g., network extenders 110, stations 115, client devices 120, etc.) that it is operating as a MBS. The network device may inform the other network devices via information contained in a beacon transmitted from the network device. When a station (e.g., network extender 110, station 115, client device 120, etc.) associates with a network device operating as an access point and MBS, the station's basic service set identifier (BSSID) may be captured by the network device and the BSSID may be used to establish a WDS link between the network device and the station.

If the network device does not receive an IP address after initialization, the network device may be configured to operate as a station and the network device may attempt to associate with an access point (e.g., access point 105 or network extender 110). The network device may detect a nearby access point's RSSI, operation status (e.g., MBS or RBS), and other estimated bandwidth information from the access point's beacon. Where multiple access points are detected, the network device may attempt to associate with the best access point available (e.g., based on the RSSI, operation status, and/or other bandwidth information). If the network device successfully associates with an access point operating as a MBS, and the RSSI associated with the access point is above a threshold value, the network device may be configured as a network extender operating as a RBS, a WDS link may be established between the network device and the access point, the network device may be configured with an SSID provided by the access point, and WLAN (e.g., Wi-Fi) link encryption may be established at the network device. Additionally, RBS mode information may be added to the network extender's beacon to indicate the RBS mode.

If the network device does not receive an IP address after initialization, the network device may be configured to operate as a station and may attempt to associate with an access point (e.g., access point 105 or network extender 110). If the network device is able to associate with an access point, but the network device does not detect MBS/RBS information in the access point's beacon or if the received signal strength is below a set value, the network device may remain configured as a station.

In embodiments, when the network device is associated with an access point configured as a MBS or RBS, the network device may make a determination whether to operate as a station or an access point/RBS based upon the RSSI of the associated access point. For example, the network device may be configured with an extender add threshold, and if the RSSI associated with the access point is greater than the extender add threshold, the network device may be configured as an access point/RBS. If the RSSI value associated with the access point is less than the extender add threshold, the network device may remain configured as a station. It should be understood that the network device may enter a RBS or a station mode automatically, without end-user intervention, based on the RSSI associated with the access point or based on another metric associated with the access point.

While a network device is operating as a station or as an access point/RBS, if the RSSI of an associated access point drops below an extender drop threshold value (e.g., 10 dBm or other value), or if the network device otherwise loses connection with an associated access point, the network device may enter a station/RBS mode and may perform a scan to search for another access point/MBS or network extender/RBS with which to associate. If the network device identifies an access point/MBS or network extender/RBS with a better RSSI (e.g., RSSI higher than that of the previously associated access point or network extender, or an RSSI above a predetermined threshold), then the network device may associate with the identified access point/MBS or network extender/RBS. It should be understood that other metrics may be used to make the determination whether to associate with an identified access point/MBS or network extender/RBS. For example, if the network device identifies multiple devices, the network device may associate with the identified device having the best bandwidth capability. A bandwidth capability of an access point or network extender may be based on one or more factors including, but not limited to MBS/RBS mode, RSSI value, estimated throughput from the access point or extender to the network device, number of devices associated with the access point or extender, service type of associated devices, and others. The bandwidth capability of an access point or network extender may be included within a network beacon that is transmitted from the access point or extender to the network device.

The capability of a network device to automatically associate with an access point and/or one or more stations may be enabled/disabled by the network device's built-in web GUI and/or an operator's WAN TR69 remote management server. The device's built-in web GUI and/or the operator's WAN TR69 may similarly be used to configure the values of the extender add threshold and the extender drop threshold.

Figure 2:
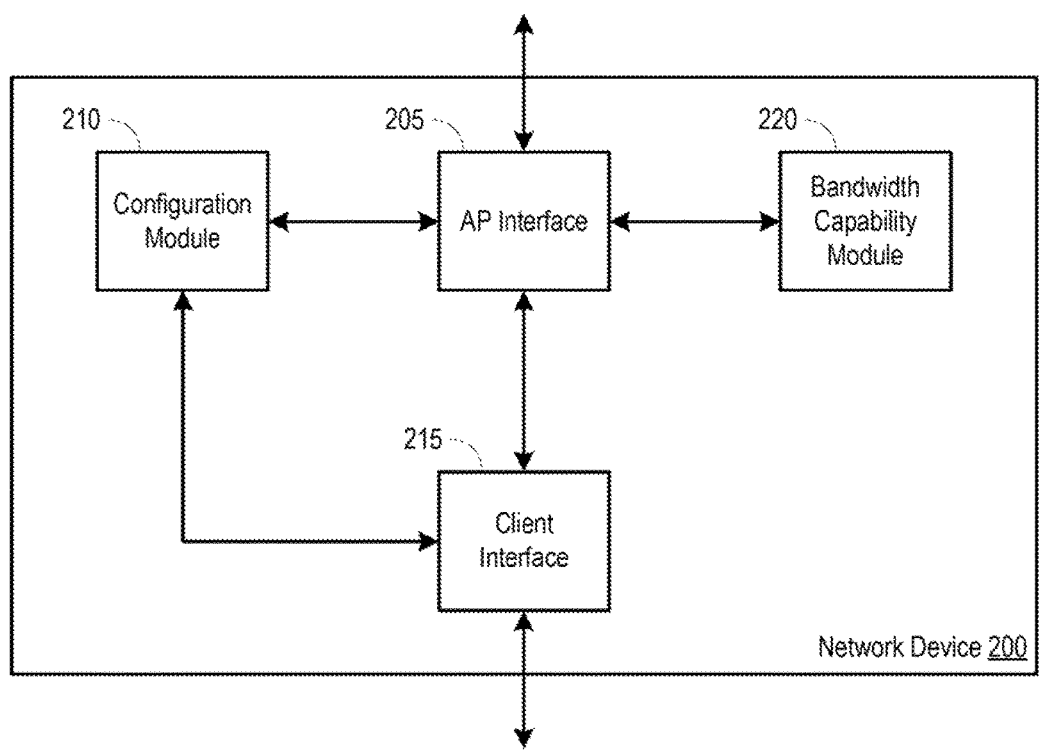
FIG. 2 is a block diagram illustrating an example network device operable to facilitate the automatic configuration of a network device within a wireless distribution system extended network.

FIG. 2 is a block diagram illustrating an example network device 200 operable to facilitate the automatic configuration of a network device within a wireless distribution system (WDS) extended network. The network device 200 may include an access point (AP) interface 205, a configuration module 210, a client interface 215, and a bandwidth capability module 220.

In embodiments, the network device 200 may pass communications to and may receive communications from one or more associated stations (e.g., stations 115 of FIG. 1, client devices 120 of FIG. 1, one or more network extenders 110 of FIG. 1, etc.) through a client interface 215. The client interface 215 may include a wireless interface configured to receive and to transmit wireless communications (e.g., 802.11 packet exchanges).

The network device 200 may communicate with one or more associated access points (e.g., access point 105 of FIG. 1, network extenders 110, etc.) over a wireless distribution system (WDS) through the AP interface 205. For example, an access point 105 may be configured as an access point and a master base station (MBS) and the network device 200 may be configured as a station or as a remote base station (RBS). The AP interface 205 may include one or more interfaces to any medium used for communication (e.g., MoCA, 802.11, G.hn, HomePlug AV (HPAV), HPAV2, Bluetooth, Zigbee, Zwave, etc.) and/or one or more wireless interfaces configured to receive and to transmit wireless communications (e.g., 802.11 packet exchanges).

In embodiments, a configuration module 210 may apply configuration parameters associated with an access point and may apply configuration information associated with one or more stations that are designated to wirelessly communicate with the network device 200. Configuration information may include media access control (MAC) addresses associated with devices operating as either access points/MBSs or network extenders/RBSs, an operation mode controlling whether the network device 200 is operating as an access point/MBS or a network extender/RBS, wireless network parameters (e.g., SSID, passphrase, etc.), and other information.

In embodiments, the configuration module 210 may periodically or conditionally (e.g., upon a boot of the network device 200) identify an access point to associated with, collect configuration parameters and information (e.g., MAC addresses, WPA passphrase, SSID, etc.) from associated access points and stations, and determine in which functional mode to operate (e.g., MBS, RBS, etc.). Where multiple access points are identified, the configuration module 210 may select a best access point 105 or network extender 110 during association and roaming. For example, the best access point may be the available access point (e.g., access point 105 or network extender 110) having the strongest received signal strength indicator (RSSI) and/or the available access point having the highest bandwidth capability.

In embodiments, an item of role may be updated within a beacon message of the network device 200 according to the current mode within which the network device 200 is operating. While the network device is operating as a MBS, the network device 200 may include an item of role within the beacon message, the item of role providing an indication to other devices within the network that the network device is operating as a MBS. While the network device is operating as a RBS, the network device 200 may include an item of role within the beacon message, the item of role providing an indication to other devices within the network that the network device is operating as a RBS. When the network device 200 is operating as a MBS and receives a beacon message identifying a device as a RBS, the network device 200 may automatically establish a WDS link with the device, and when the network device 200 is operating as a RBS and receives a beacon message identifying a device as a MBS, the network device 200 may automatically establish a WDS link with the device.

In embodiments, the configuration module 210 may detect when the network device 200 has exited the functional range of an associated access point or when the link between the network device 200 and the access point has otherwise degraded past a certain threshold level. The configuration module may detect a loss or degradation in the link when a RSSI is received from the associated access point that is below a threshold level or when the bandwidth provided to the network device 200 drops below a threshold level. The determination that the network device 200 is outside of a functional range of an associated access point may be based upon an identification of another access point that is capable of providing the network device 200 with a stronger RSSI or more bandwidth. When the configuration module 210 detects a loss or degradation in the link between the network device 200 and the associated access point, the configuration module may identify another capable access point and may initiate an association with the identified access point.

The configuration module 210 may switch the operating mode of the network device 200 between a remote base station (RBS) mode and a station mode based on one or more parameters of a link between the network device 200 and an available access point. While operating in a RBS mode, the network device 200 may associate with a MBS or another RBS (e.g., an access point 105 or network extender 110) as a station and may also operate as an access point by allowing a station (e.g., network extender 110, station 115, client device 120, etc.) to associate with it. Thus, a network device 200 operating as a RBS may be associated with an access point over a WDS link and one or more stations may be associated with the network device 200 over a WLAN (e.g., Wi-Fi) link. While operating in a station mode, the network device 200 may associate with a MBS or another RBS as a station and may preclude other stations from associating with the network device 200.

In embodiments, when the network device associates with an access point operating as a MBS or RBS, the configuration module 210 may compare a RSSI of the access point to a predetermined threshold (e.g., extender add threshold). If the RSSI associated with the access point is greater than the threshold value, the configuration module 210 may configure the network device 200 as a network extender operating as a RBS, may configure the network device 200 with an SSID provided by the access point, and may establish WLAN (e.g., Wi-Fi) link encryption at the client interface 215. Additionally, the configuration module 210 may add RBS mode information to the network device's beacon that is transmitted from the client interface 215, thereby informing other stations of the network device's current operating status as a RBS.

If the network device 200 does not receive an IP address after a boot operation, the network device 200 does not detect MBS or RBS information in an associated access point's beacon, or if the RSSI of the associated access point is less than a predetermined threshold (e.g., extender add threshold), then the configuration module 210 may configure the network device 200 as a station.

While the network device 200 is operating as a RBS, the configuration module 210 may monitor the RSSI of the associated access point and/or the bandwidth available to the network device 200 from the associated access point. If the RSSI of the associated access point drops below an extender drop threshold value, or if the network device 200 otherwise loses connection with the associated access point, the configuration module 210 may configure the network device 200 as a station and may initiate a search for another access point with which to associate. The configuration module 210 may configure the network device 200 as a station and may initiate a search for another access point if the configuration module 210 detects that the available bandwidth has dropped below a certain level. For example, the bandwidth capability module 220 may determine a certain bandwidth required by the network device 200 to maintain current or anticipated operations (e.g., delivering services to connected station(s), performing operations for output at the network device 200, etc.). The bandwidth capability module 220 may determine the required bandwidth based upon the number of stations connected to the network device 200, the types of services being delivered to the connected stations, and other factors. The configuration module 210 may compare the required bandwidth to a bandwidth capability indicated by a beacon received from one or more access points.

If the configuration module 210 identifies an access point with an acceptable RSSI (e.g., RSSI higher than that of the previously associated access point or an RSSI above a predetermined threshold), then the network device 200 may associate with the identified access point. It should be understood that other metrics may be used to make the determination whether to associate with an identified access point. For example, if the configuration module 210 identifies multiple access points, the network device 200 may associate with the identified access point having the best bandwidth capability. A bandwidth capability of an access point may be based on one or more factors including, but not limited to MBS/RBS mode, RSSI value, estimated throughput from the access point to the network device 200, number of devices associated with the access point, service type of associated devices, and others. The bandwidth capability of an access point may be included within a network beacon that is transmitted from the access point to the network device 200.

Figure 3:
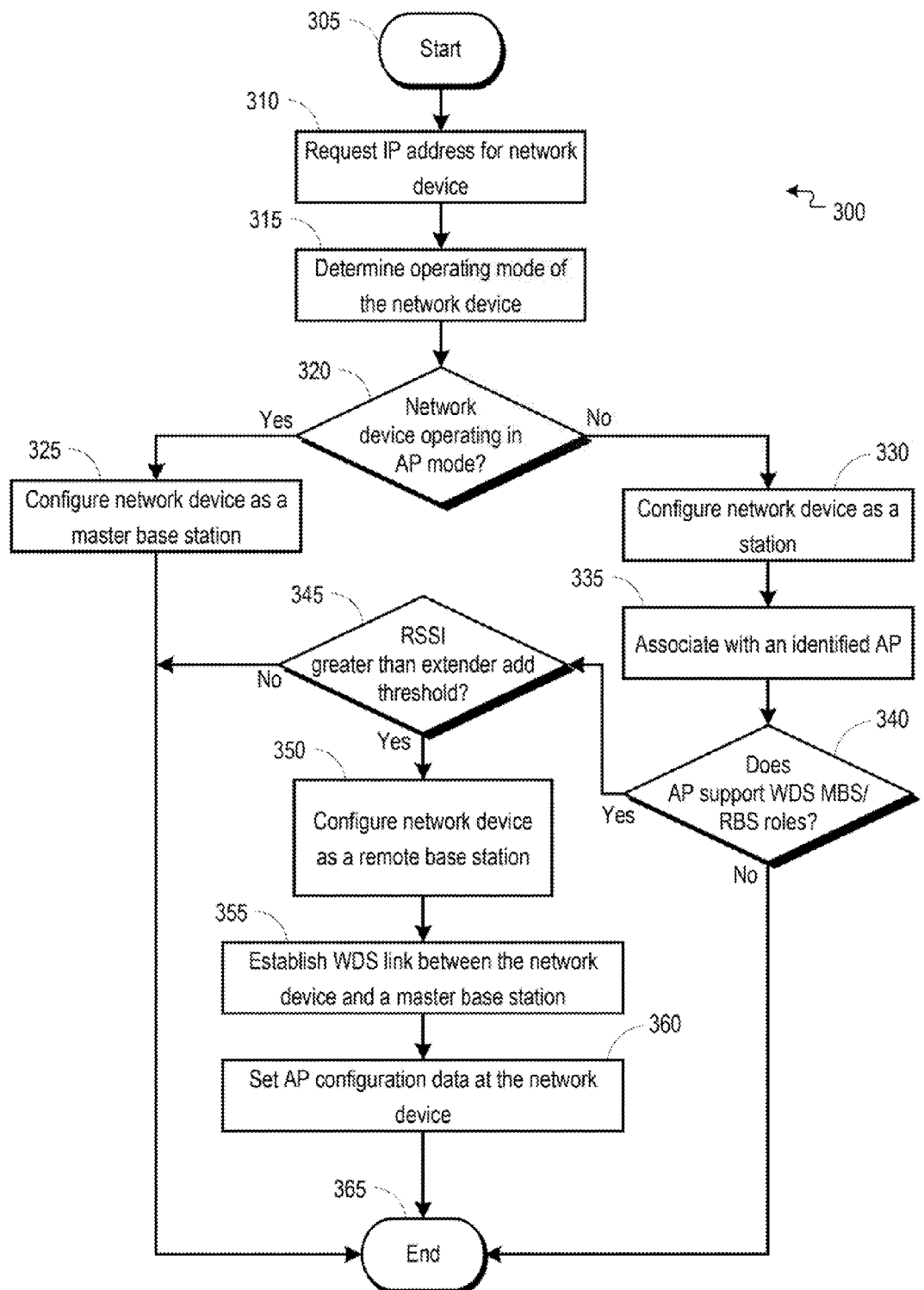
FIG. 3 is a flowchart illustrating an example process operable to facilitate the automatic configuration of a network device within a wireless distribution system extended network.

FIG. 3 is a flowchart illustrating an example process 300 operable to facilitate the automatic configuration of a network device within a wireless distribution system (WDS) extended network. The process 300 may begin at 305 when an automatic configuration triggering event occurs. An automatic configuration triggering event may include a power cycle at a network device (e.g., access point 105 of FIG. 1, network extender 110 of FIG. 1, station 115 of FIG. 1, etc.), a reset of a network device, a reboot of a network device, a reception of an auto-configuration initiation command (e.g., command received as a management information base (MIB) or web graphical user interface (WebGUI) command), a degradation in or loss of a connection between a network device and access point or network extender, or any other event causing the initiation of an automatic configuration of a network device.

At 310, the network device may request an Internet protocol (IP) address. The network device may request an IP address from an access point 105 or gateway/router device (e.g., through an AP interface 205 of FIG. 2) via dynamic host configuration protocol (DHCP).

At 315, an operating mode of the network device may be determined. The operating mode of the network device may be determined, for example, by a configuration module 210 of FIG. 2. In embodiments, the operating mode of the network device may be determined based upon whether the device receives an IP address via DHCP. For example, if the network device receives an IP address via DHCP, the operation mode of the network device may be set to an access point, and if the network device does not receive an IP address via DHCP, the operation of the network device may be set to a station. The determination of the operating mode of the network device may be based upon information carried within a packet received from the network device.

At 320, the determination may be made whether the network device is operating in an access point mode. The determination whether the network device is operating in an access point mode may be made, for example, by a configuration module 210 of FIG. 2 associated with the network device.

If, at 320, the determination is made that the network device is operating in an access point mode, the process 300 may proceed to 325. At 325, the network device may be configured as a master base station (MBS). The network device may be configured as a MBS, for example, by the configuration module 210. In embodiments, when the network device is configured as a MBS, an item of role may be added to the beacon message of the network device. The beacon message, including the item of role, may be broadcast from the network device into the wireless network, and the item of role may indicate to other devices within the network that the network device is operating as a MBS.

If, at 320, the determination is made that the network device is not operating in an access point mode, the process 300 may proceed to 330. At 330, the network device may be configured as a station. The network device may be configured as a station, for example, by the configuration module 210.

At 335, the network device may be associated with an access point. (e.g., access point 105 or network extender 110). The network device may receive a beacon from one or more access points (e.g., access point 105 or network extender 110) and may retrieve information (e.g., RSSI, MBS/RBS operation status, and other estimated bandwidth information) associated with an access point from a beacon received from the access point. If the network device receives a beacon from a plurality of access points, the network device may choose to associate with the best available access point as determined by information carried by the beacon.

At 340, the determination may be made whether the identified access point supports the WDS operating modes of a MBS and/or RBS. The determination whether the identified access point supports the WDS operating modes of a MBS and/or RBS may be made, for example, by the configuration module 210. In embodiments, the determination may be based upon an MBS/RBS operation status indicator carried by a beacon received from the access point. If the determination is made that the identified access point is not capable of operating as a MBS and/or RBS, the network device may remain configured as a station.

If, at 340, the determination is made that the identified access point is capable of operating as a MBS and/or RBS, the process 300 may proceed to 345. At 345, the determination may be made whether an RSSI associated with the access point is greater than a predetermined extender add threshold. The determination whether an RSSI associated with the access point is greater than a predetermined extender add threshold may be made, for example, by the configuration module 210. In embodiments, the network device may be configured with an extender add threshold, and if the RSSI associated with the access point is greater than the extender add threshold, the network device may be configured as an access point/RBS. If the RSSI value associated with the access point is less than the extender add threshold, the network device may remain configured as a station.

If, at 345, the determination is made that the RSSI value associated with the access point is greater than the extender add threshold, the process 300 may proceed to 350. At 350, the network device may be configured as a remote base station. The network device may be configured as a network extender operating as a remote base station, for example, by the configuration module 210. In embodiments, the determination whether an identified access point can support configuration of the network device as a RBS may be based upon a bandwidth capability metric. For example, a bandwidth capability metric associated with the access point may be taken or retrieved and may be compared to a stored bandwidth capability metric needed by the network device to carry out a current or anticipated use case.

At 355, a WDS link may be established between the network device and an access point (e.g., access point 105 of FIG. 1 or master base station, network extender 110 of FIG. 1 or remote base station). The WDS link may be established, for example, by the configuration module 210 over an AP interface 205 of FIG. 2. In embodiments, devices operating within a network may broadcast a beacon message that includes an indication of whether each respective one of the devices is operating as a MBS or RBS. A network device operating as a MBS may scan the wireless network and may receive a beacon message from another device (e.g., an access point). If the beacon message includes an item of role (e.g., item of role indicating that the source device is operating as a RBS), the MBS may begin to establish a WDS link with the other device using a unique identifier (e.g., MAC address) obtained from the beacon message. An RBS may similarly identify a device operating as a RBS/MBS, and may establish a WDS link with the identified RBS/MBS.

At 360, access point configuration data may be set at the network device. Access point configuration data may be gathered, for example, through the AP interface 205 and may be set, for example, at the configuration module 210. In embodiments, the network device may be configured with an SSID provided by the access point, and WLAN (e.g., Wi-Fi) link encryption may be established at the network device. Remote base station mode information may be added to the network extender's beacon to indicate to other devices that the network device is operating in a remote base station mode. The process may end at 365.

Figure 4:
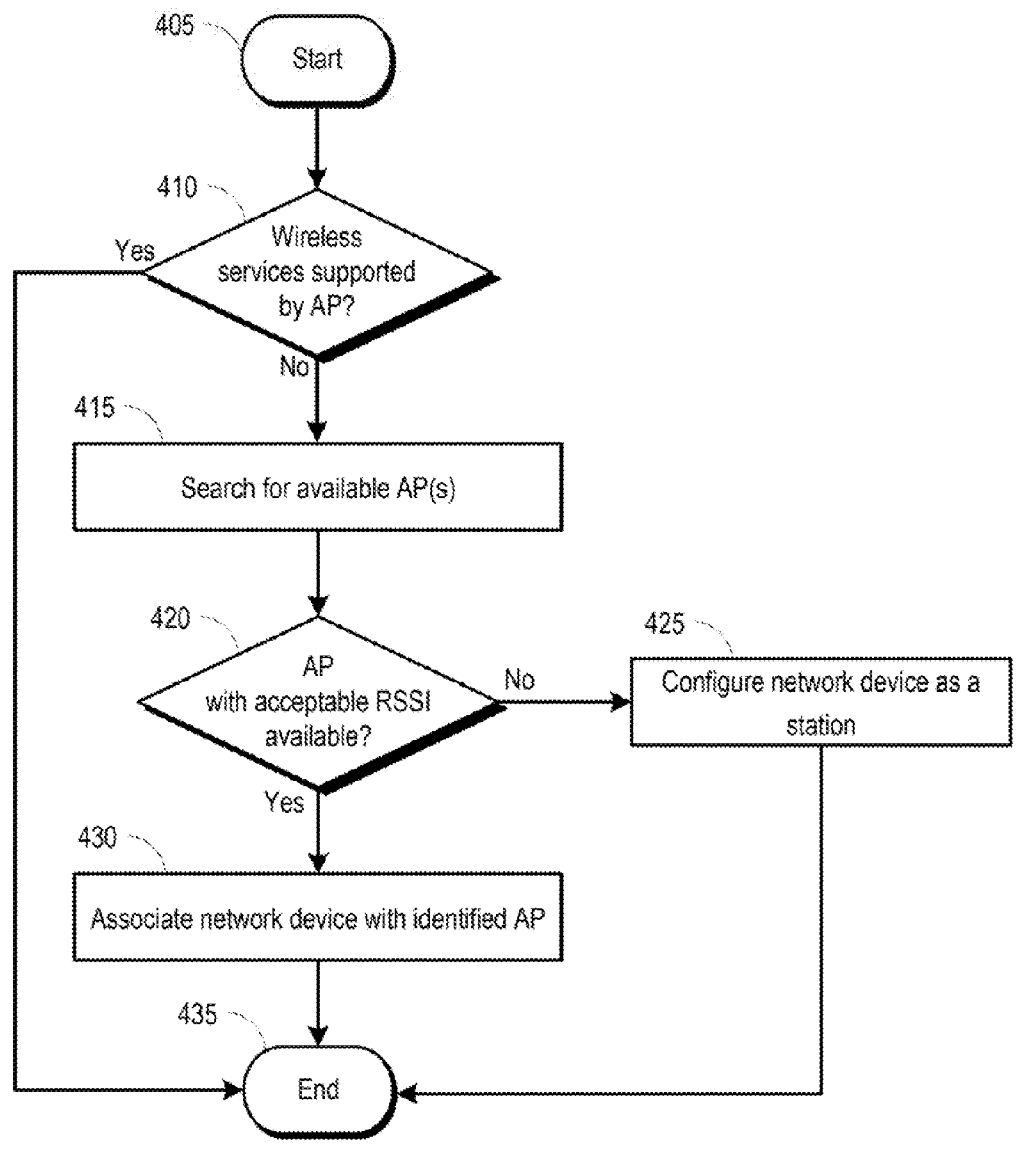
FIG. 4 is a flowchart illustrating an example process operable to facilitate network device configuration based upon available access point parameters.

FIG. 4 is a flowchart illustrating an example process 400 operable to facilitate network device configuration based upon available access point parameters. The process 400 may begin at 405 while a network device (e.g., network extender 110 of FIG. 1) is operating as a remote base station. While operating as a remote base station, the network device may communicate with an access point (e.g., a master base station such as an access point 105 of FIG. 1 or a remote base station such as a network extender 110), and the network device may deliver one or more services to one or more client devices (e.g., station 115 of FIG. 1, client device 120 of FIG. 1, or another remote base station such as a network extender 110) over a wired or wireless interface. The process 400 may be carried out periodically or continuously while the network device is operating as a remote base station.

At 410, the determination may be made whether wireless services received by the network device are supported by the access point to which the network device is currently associated with. The determination whether wireless services are supported by the access point may be based on a determination whether a bandwidth provided to the network device has dropped below a certain level and/or whether an RSSI of an associated access point is less than an extender drop threshold. The determination whether the RSSI is less than an extender drop threshold may be made, for example, by the configuration module 210 of FIG. 2. In embodiments, the network device may be configured with an extender drop threshold value. The extender drop threshold value may be a minimum RSSI value that is operable to provide the network device with enough bandwidth to perform one or more operations. For example, the extender drop threshold value may be based upon the intended function of the network device, the number of devices to which the network device is delivering one or more services, the bandwidth required for delivering one or more services to associated devices, and other factors. It should be understood that the determination may be made that the RSSI of the associated access point is less than the extender drop threshold if the connection between the network device and the access point is lost. If the determination is made that the RSSI is not less than the extender drop threshold, the network device may remain configured as a remote base station and may maintain a connection (e.g., over a WDS link) with the access point.

If, at 410, the determination is made that the RSSI of the associated access point is less than the extender drop threshold value, the process 400 may proceed to 415. At 415, the network device may search for available access points (e.g., access points configured as a master base station such as access point 105 of FIG. 1 or access points configured as remote base stations such as network extenders 110 of FIG. 1). In embodiments, the network device may receive a beacon (e.g., advertisement message, probe request/response, etc.) from one or more access points through, for example, the AP interface 205. It should be understood that the network device may dis-associate from a previously associated access point while scanning a network for other access points, or the network device may stay associated with an access point and may scan the network for other access points while operating in a background mode.

At 420, the determination may be made whether an access point with an acceptable RSSI is available to the network device. The determination whether an access point with an acceptable RSSI is available may be made, for example, by the configuration module 210. In embodiments, the configuration module 210 may compare the RSSI of each of one or more identified access points to a predetermined RSSI threshold value (e.g., a configured extender add/drop threshold value, the RSSI value of the currently associated access point, etc.). If the RSSI value of one or more identified access points is greater than the predetermined RSSI threshold value, then the network device may determine that an access point with an acceptable RSSI is available. In embodiments, the determination whether an identified access point can support configuration of the network device as a RBS may be based upon a bandwidth capability metric. For example, a bandwidth capability metric associated with the access point may be taken or retrieved and may be compared to a stored bandwidth capability metric needed by the network device to carry out a current or anticipated use case.

If, at 420, the determination is made that no access point with an acceptable RSSI is available, the process 400 may proceed to 425. At 425, the network device may be configured as a station. The operation status of the network device may be changed from a remote base station to a station, and any existing links (e.g., WLAN links) between the network device and other stations (e.g., station 115, network extender 110, client device 120, etc.) may be dropped. It should be understood that the network device may remain configured as a RBS until the determination is made that no acceptable access points are available to the network device.

If, at 420, the determination is made that at least one access point with an acceptable RSSI is available, the process 400 may proceed to 430. At 430, the network device may be associated with the identified access point. In embodiments, the network device may establish a communication link (e.g., WDS link) with the identified access point, and the network device may continue to operate as a remote base station. The process 400 may end at 435.

Figure 5:
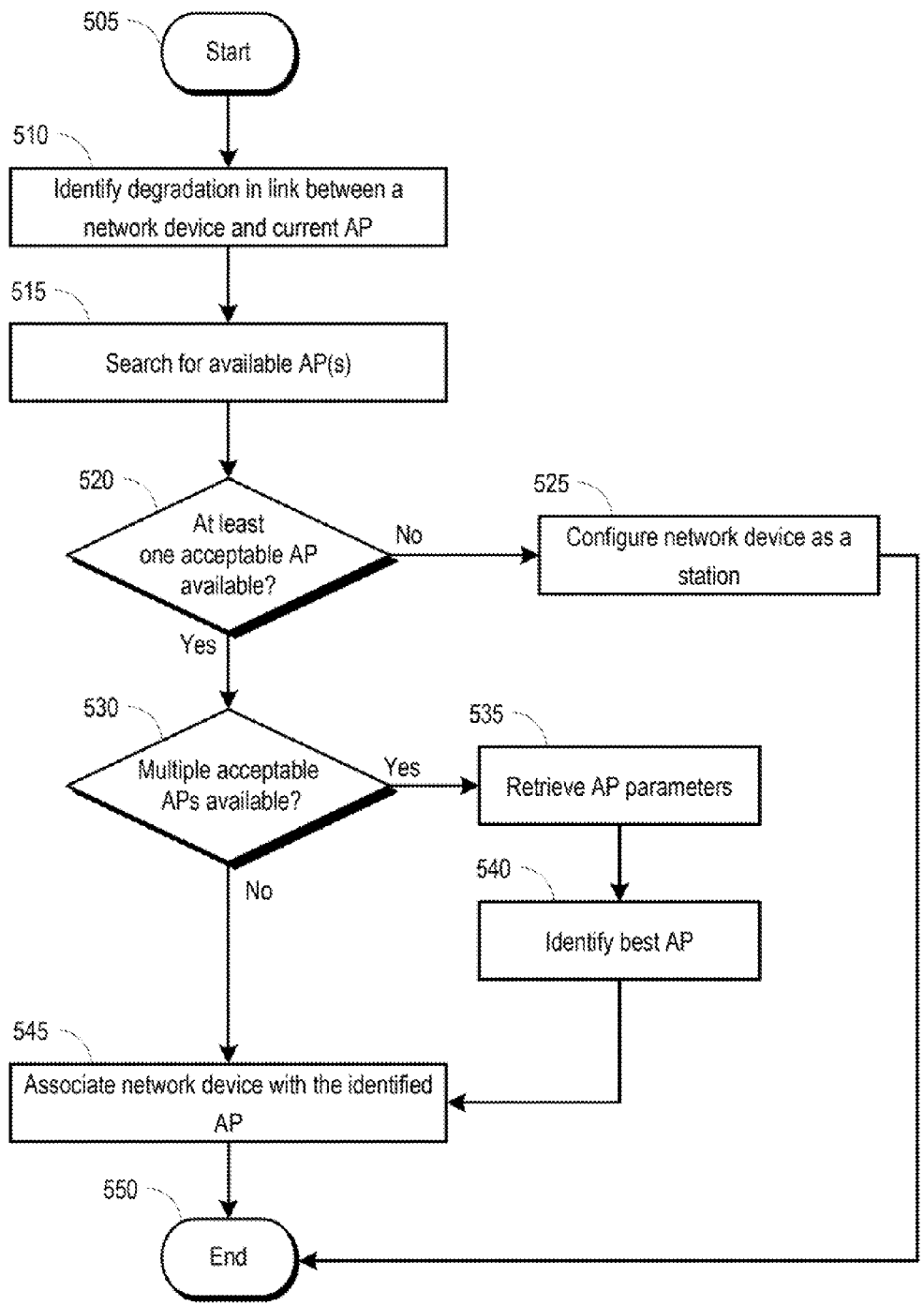
FIG. 5 is a flowchart illustrating an example process operable to facilitate the configuration of network device and access point links based upon available access point parameters.

FIG. 5 is a flowchart illustrating an example process 500 operable to facilitate the configuration of network device and access point links based upon available access point parameters. The process 500 may begin at 505 while a network device (e.g., network extender 110 of FIG. 1) is operating as a station or remote base station. While operating as a remote base station, the network device may communicate with an access point (e.g., a master base station such as an access point 105 of FIG. 1 or a remote base station such as a network extender 110) over a communication link (e.g., WDS link), and the network device may deliver one or more services to one or more client devices (e.g., station 115 of FIG. 1, client device 120 of FIG. 1, or another remote base station such as a network extender 110) over a wired or wireless interface. The process 500 may be carried out periodically or continuously while the network device is operating as a remote base station.

At 510, a degradation in the link between the network device and currently associated access point may be identified. A degradation may be identified, for example, by a configuration module 210 of FIG. 2. In embodiments, the degradation may be a drop in the RSSI of the access point (e.g., RSSI dropping below a threshold such as an extender drop threshold), a drop in bandwidth made available to the network device by the access point, and others. An identified degradation may be a degradation in the link that precludes the network device from receiving enough bandwidth to continue operating at a current or expected use case. For example, the bandwidth required by a network device may be based upon the current or expected function of the network device, the number of devices (e.g., network extender 110 of FIG. 1, station 115 of FIG. 1, client device 120 of FIG. 1, etc.) connected to or otherwise served by the network device, the types of devices connected to or otherwise served by the network device, and others.

At 515, the network device may search for available access points (e.g., access points configured as a master base station such as access point 105 of FIG. 1 or access points configured as remote base stations such as network extenders 110 of FIG. 1). In embodiments, the network device may receive a beacon (e.g., advertisement message, probe request/response, etc.) from one or more access points through, for example, the AP interface 205. A beacon received at the network device from an access point may include information identifying the access point as well as parameters associated with the link between the network device and the access point. For example, the parameters carried by the beacon may include an RSSI value associated with the connection between the network device and the access point, a bandwidth capability metric (e.g., a measure of the expected bandwidth available to the network device from the access point), and/or other metrics that may be used to identify a suitable access point. A bandwidth capability metric may be based on one or more factors including, but not limited to MBS/RBS mode, RSSI value, estimated throughput from the access point to the network device, number of devices associated with the access point, service type of associated devices, and others.

At 520, the determination may be made whether at least one acceptable access point is available. The determination whether an acceptable access point is available may be made, for example, by a configuration module 210 of FIG. 2 and/or a bandwidth capability module 220 of FIG. 2. In embodiments, the network device may determine that at least one acceptable access point is available if a beacon received from an access point includes parameters (e.g., RSSI, bandwidth capability, etc.) that are required for the network device to operate at a certain performance level (e.g., based upon the number of devices connected to the network device and/or the types of services provided to the devices by the network device).

If, at 520, the determination is made that no acceptable access point is available, the process 500 may proceed to 525. At 525, the network device may be configured as a station. The operation status of the network device may be changed from a remote base station to a station, and any existing links (e.g., WLAN links) between the network device and other stations (e.g., station 115, network extender 110, client device 120, etc.) may be dropped.

If, at 520, the determination is made that at least one acceptable access point is available, the process 500 may proceed to 530. At 530, the determination may be made whether multiple acceptable access points are available. For example, the determination may be made that multiple acceptable access points are available if the network device receives beacons from multiple access points indicating that access points are capable of providing sufficient bandwidth (e.g., based on RSSI, bandwidth capability, etc.) to the network device.

If, at 530, the determination is made that multiple acceptable access points are available, the process 500 may proceed to 535. At 535, access point parameters associated with the identified access points may be retrieved. In embodiments, the bandwidth capability module 220 may retrieve access point parameters (e.g., RSSI value, bandwidth capability metric, etc.) from beacons received from the access points, and the bandwidth capability module 220 may compare the retrieved parameters to threshold values. For example, the bandwidth capability module 220 may compare a retrieved RSSI value or bandwidth capability metric to a stored RSSI value or bandwidth capability metric needed by the network device to carry out a current or anticipated use case.

At 540, a best access point available may be identified. In embodiments, the bandwidth capability module 220 may compare the retrieved access point parameters and select the access point having the best or most relevant access point parameters. For example, the bandwidth capability module 220 may select the access point having the highest RSSI value and/or highest bandwidth capability metric.

At 545, the network device may be associated with the identified access point. In embodiments, the network device may establish a communication link (e.g., WDS link) with the identified access point, and the network device may continue to operate as a remote base station. The process 500 may end at 550.

Figure 6:
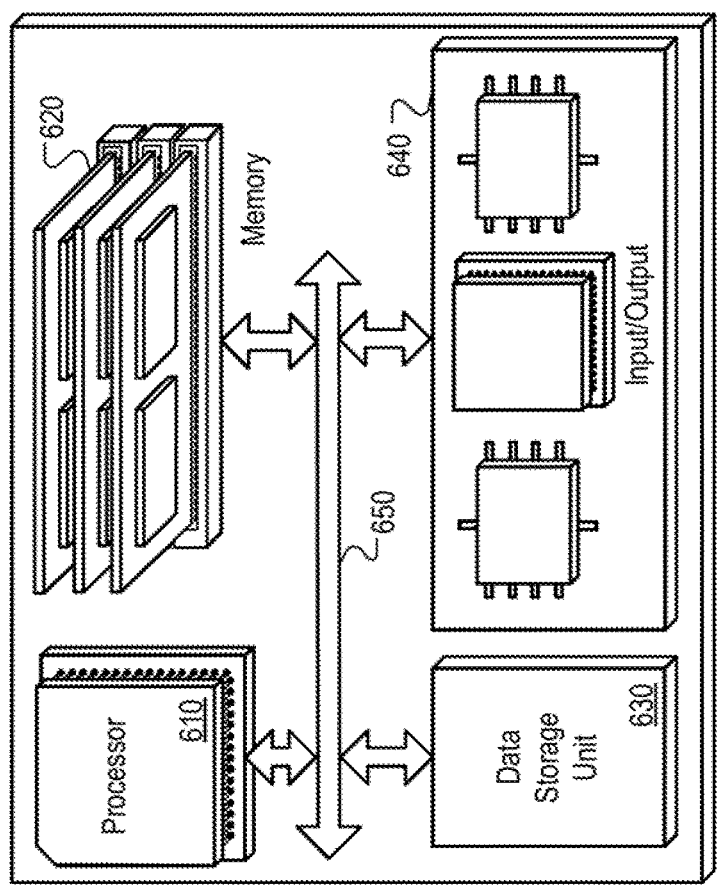
FIG. 6 is a block diagram of a hardware configuration operable to facilitate the automatic configuration of a network device within a wireless distribution system extended network.

FIG. 6 is a block diagram of a hardware configuration 600 operable to facilitate the automatic configuration of a network device within a wireless distribution system (WDS) extended network. It should be understood that the hardware configuration 600 can exist in various types of devices. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In embodiments, the input/output device 640 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more devices within a subscriber premise (e.g., access point 105 of FIG. 1, network extender 110 of FIG. 1, station 115 of FIG. 1, client device 120 of FIG. 1, etc.) and/or one or more networks (e.g., subscriber network 130 of FIG. 1, WAN 125 of FIG. 1, local network, etc.).

Those skilled in the art will appreciate that the invention improves upon methods and apparatuses for configuring a wireless distribution system (WDS) extended network. Methods, systems, and computer readable media may be operable to facilitate the automatic configuration of a network device within a WDS extended network. Upon the boot of a network device such as a network extender, the network device may search for an access point through the transmission and reception of wireless communications. Once an access point is found, the network device may attempt to connect to the access point and may self-configure as either a station or a station operating as an access point. The network device may make the determination whether to operate as an access point based upon one or more network and/or device parameters associated with the identified access point, and may switch between station and station-access point modes based upon the link connecting the network device to the access point.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   outputting a request for a network address from a network device;
   if no network address is received in response to the request for a network address:
   configuring the network device as a station;
   associating the network device with an access point;
   determining whether a received signal strength indicator associated with the access point is greater than a predetermined add threshold; and
   if the received signal strength indicator associated with the access point is greater than the predetermined add threshold:
   configuring the network device as a remote base station; and
   establishing a wireless distribution system link between the network device and the access point; and
   if a network address is received in response to the request for a network address:
   configuring the network device as master base station; and
   adding an item of role to a beacon message of the network device, wherein the item of role provides an indication that the network device is operating as a master base station.

2. The method of claim 1, wherein the access point is configured as a remote base station or a master base station.

3. The method of claim 1, further comprising:
   detecting a degradation in a link between the network device and the access point;
   identifying a second access point, wherein the second access point is identified based upon a beacon message received at the network device from the access point, the beacon message identifying the access point as a master base station or a remote base station;
   determining whether a received signal strength indicator associated with the second access point is greater than the predetermined add threshold; and
   if the received signal strength indicator associated with the second access point is greater than the predetermined add threshold, associating the network device with the second access point.

4. The method of claim 3, wherein detecting the degradation in the link between the network device and the access point comprises determining that the received signal strength indicator associated with the access point is less than a predetermined drop threshold.

5. The method of claim 1, further comprising:
wherein the access point is identified from a plurality of access points;
determining a bandwidth capability for each of the plurality of access points; and
wherein the identified access point comprises the highest bandwidth capability of the plurality of access points.

6. The method of claim 5, wherein determining the bandwidth capability for each of the plurality of access points comprises, for each respective one of the plurality of access points, retrieving a bandwidth capability indicator from a beacon received at the network device from the respective one access point.

7. The method of claim 1, further comprising:
updating a beacon message that is output from the network device to include an indication of the configuration of the network device as a remote base station.

8. A network device comprising:
an interface configured to be used to output a request for a network address;
one or more modules configured to:
if no network address is received in response to the request for a network address:
configure the network device as a station;
associate the network device with an access point;
determine whether a received signal strength indicator associated with the access point is greater than a predetermined add threshold; and
configure the network device as a remote base station and establish a wireless distribution system link between the network device and the access point if the received signal strength indicator associated with the access point is greater than the predetermined add threshold; and
if a network address is received in response to the request for a network address:
configure the network device as master base station; and
add an item of role to a beacon message of the network device, wherein the item of role provides an indication that the network device is operating as a master base station.

9. The network device of claim 8, wherein the one or more modules are further configured to:
detect a degradation in a link between the network device and the access point;
identify a second access point, wherein the second access point is identified based upon a beacon message received at the network device from the access point, the beacon message identifying the access point as a master base station or a remote base station;
determine whether a received signal strength indicator associated with the second access point is greater than the predetermined add threshold; and
associate the network device with the second access point if the received signal strength indicator associated with the second access point is greater than the predetermined add threshold.

10. The network device of claim 9, wherein detecting the degradation in the link between the network device and the access point comprises determining that the received signal strength indicator associated with the access point is less than a predetermined drop threshold.

11. The network device of claim 8, wherein the one or more modules are further configured to, when the access point is identified from a plurality of access points, determine a bandwidth capability for each of the plurality of access points, wherein the identified access point comprises the highest bandwidth capability of the plurality of access points.

12. The network device of claim 11, wherein determining the bandwidth capability for each of the plurality of access points comprises, for each respective one of the plurality of access points, retrieving a bandwidth capability indicator from a beacon received at the network device from the respective one access point.

13. The network device of claim 8, wherein the one or more modules are further configured to update a beacon message that is output from the network device to include an indication of the configuration of the network device as a remote base station.

14. One or more non-transitory computer readable media having instructions operable to cause one or more processors to perform the operations comprising:
outputting a request for a network address from a network device;
if no network address is received in response to the request for a network address:
configuring the network device as a station;
associating the network device with an access point;
determining whether a received signal strength indicator associated with the access point is greater than a predetermined add threshold; and
if the received signal strength indicator associated with the access point is greater than the predetermined add threshold:
configuring the network device as a remote base station; and
establishing a wireless distribution system link between the network device and the access point; and
if a network address is received in response to the request for a network address:
configuring the network device as master base station; and
adding an item of role to a beacon message of the network device, wherein the item of role provides an indication that the network device is operating as a master base station.

15. The one or more non-transitory computer-readable media of claim 14, wherein the access point is a master base station or a remote base station.

16. The one or more non-transitory computer-readable media of claim 14, wherein the instructions are further operable to cause one or more processors to perform the operations comprising:
detecting a degradation in a link between the network device and the access point;
identifying a second access point, wherein the second access point is identified based upon a beacon message received at the network device from the access point, the beacon message identifying the access point as a master base station or a remote base station;
determining whether a received signal strength indicator associated with the second access point is greater than the predetermined add threshold; and
if the received signal strength indicator associated with the second access point is greater than the predetermined add threshold, associating the network device with the second access point.

17. The one or more non-transitory computer-readable media of claim 16, wherein detecting the degradation in the link between the network device and the access point comprises determining that the received signal strength indicator associated with the access point is less than a predetermined drop threshold.

18. The one or more non-transitory computer-readable media of claim 14, wherein the instructions are further operable to cause one or more processors to perform the operations comprising:
   wherein the access point is identified from a plurality of access points;
   determining a bandwidth capability for each of the plurality of access points; and
   wherein the identified access point comprises the highest bandwidth capability of the plurality of access points.

19. The one or more non-transitory computer-readable media of claim 18, wherein determining the bandwidth capability for each of the plurality of access points comprises, for each respective one of the plurality of access points, retrieving a bandwidth capability indicator from a beacon received at the network device from the respective one access point.

20. The one or more non-transitory computer-readable media of claim 14, wherein the instructions are further operable to cause one or more processors to perform the operations comprising:
   updating a beacon message that is output from the network device to include an indication of the configuration of the network device as a remote base station.

* * * * *